F. C. HEISER.

MEASURING-FAUCET.

No. 6,722.

Reissued Nov. 2, 1875.

WITNESSES.

J. Wm. Gaines

R. M. Carr.

INVENTOR.

F. C. Heiser per

F. A. Lehmann,

Atty.

N. PETERS, PHOTO-LITHOGRAPHER, WASHINGTON, D. C.

UNITED STATES PATENT OFFICE.

FRANCIS C. HEISER, OF BROOKLYN, NEW YORK, ASSIGNOR TO JAMES M. HOPKINS, OF LOUISVILLE, KENTUCKY.

IMPROVEMENT IN MEASURING-FAUCETS.

Specification forming part of Letters Patent No. 106,816, dated August 30, 1870; reissue No. 6,722, dated November 2, 1875; application filed September 2, 1875.

*To all whom it may concern:*

Be it known that I, FRANCIS C. HEISER, of Brooklyn, in the State of New York, have invented certain new and useful Improvements in Measuring-Faucets; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to an improvement in measuring-faucets; and it consists in the arrangement and combination of parts that will be more fully described hereinafter.

Figure 1:
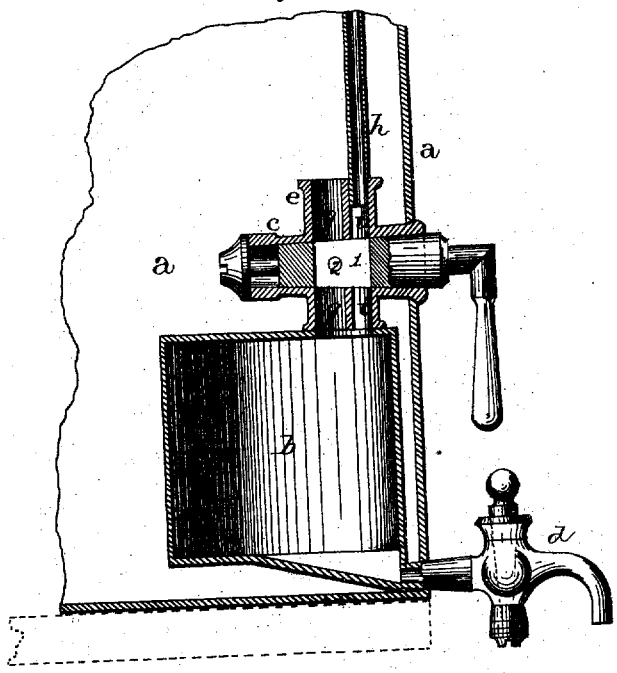
Figure 2:
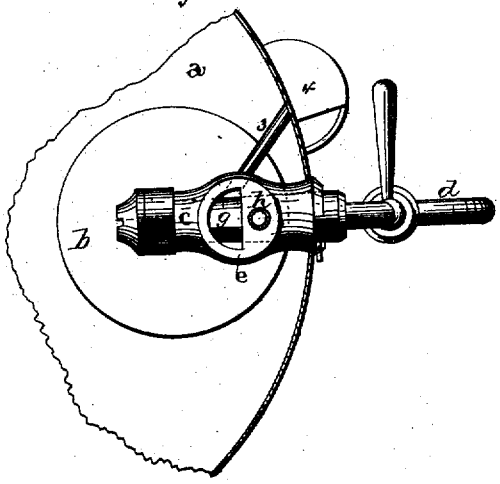

Figure 1 is a vertical section of my invention. Fig. 2 is a plan view of the same.

*a* represents the main reservoir, in or under which may be placed any desired number of measuring-vessels, *b*, which vessels may be of different capacities, from a pint to a gallon. Each of these vessels *b* are covered over on their tops, so that nothing can flow into them except through the cock *c*, and each one is provided with a faucet, *d*, to draw off the liquid after the vessel is filled. The short pipe *e*, in which the cock *c* is placed, has two separate and distinct passages through it, the larger, *g*, of which allows the fluid to flow into the vessel *b*, while the smaller one, *i*, serves for the escape of the air from the vessel *b* that is displaced by the inflowing liquid. Connected to the smaller passage *i* is a pipe, *h*, that should extend up above the highest level of the fluid in the main reservoir. The main opening 1 through the cork *c*, the handle of which extends through the side of the reservoir, so as to be outside, is large enough to extend over both passages, so that when one passage is opened both are opened, and vice versa. Leading through the side of the pipe and cock is a small opening, 2, to which is connected a pipe, 3, which pipe conveys away any fluid that is held in the hole 1 when the cock is closed, and also serves to allow air to flow into the vessel *b* as the fluid is being drawn off. The outer end of the pipe 3 passes through the side of the reservoir *a* and terminates in a hopper, 4. Each of the vessels *b* is provided with a separate cock-faucet and system of pipes, as above described.

Having thus described my invention, I claim—

1. A cock for filling vessels that is provided with a passage for the inflow of liquid, a passage for the outflow of the displaced air that communicates with the air-space of the reservoir, and a passage that communicates with the outside of the reservoir for the introduction of air to the vessel as the liquid is being drawn off.

2. A cock for filling vessels, consisting of the plug *c*, having an opening, 1, in combination with a pipe having the passage *g* for the inflow of liquid, and a pipe, *h*, that extends up above the highest level of the liquid, substantially as shown.

3. The combination of the reservoir *a*, vessels *b*, cock *c*, faucet *d*, pipe *e*, passages 1 2, tube *h*, and pipe 3, substantially as set forth.

In testimony that I claim the foregoing I have hereunto set my hand this 6th day of August, 1875.

FRANCIS C. HEISER.

Witnesses:
SAM. TRO. SMITH,
E. R. HOPKINS.